Oct. 3, 1950     D. A. ROSSI     2,524,330
DISK TYPE GARDEN CULTIVATOR
Filed Aug. 31, 1946     3 Sheets-Sheet 1
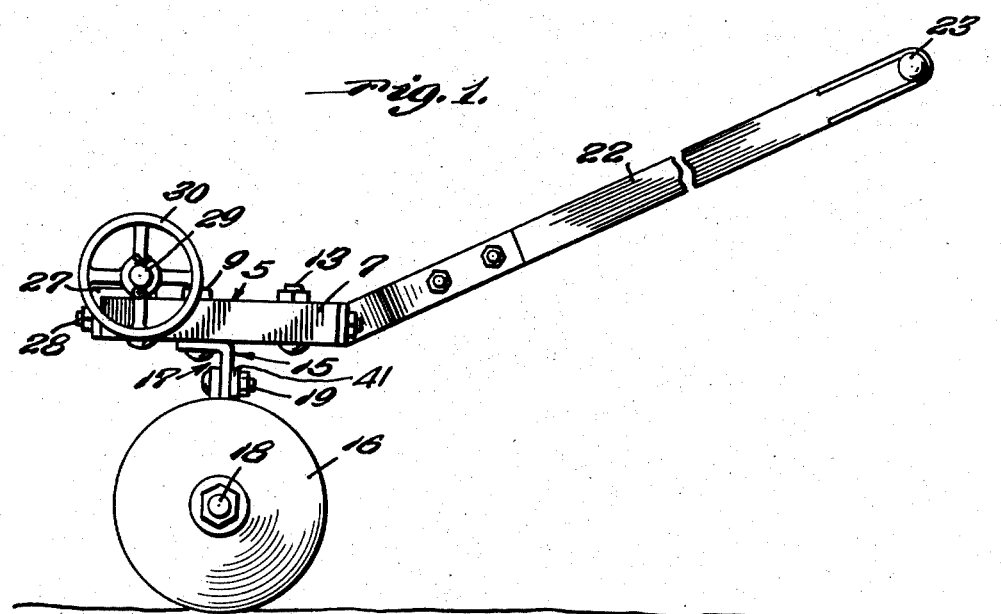
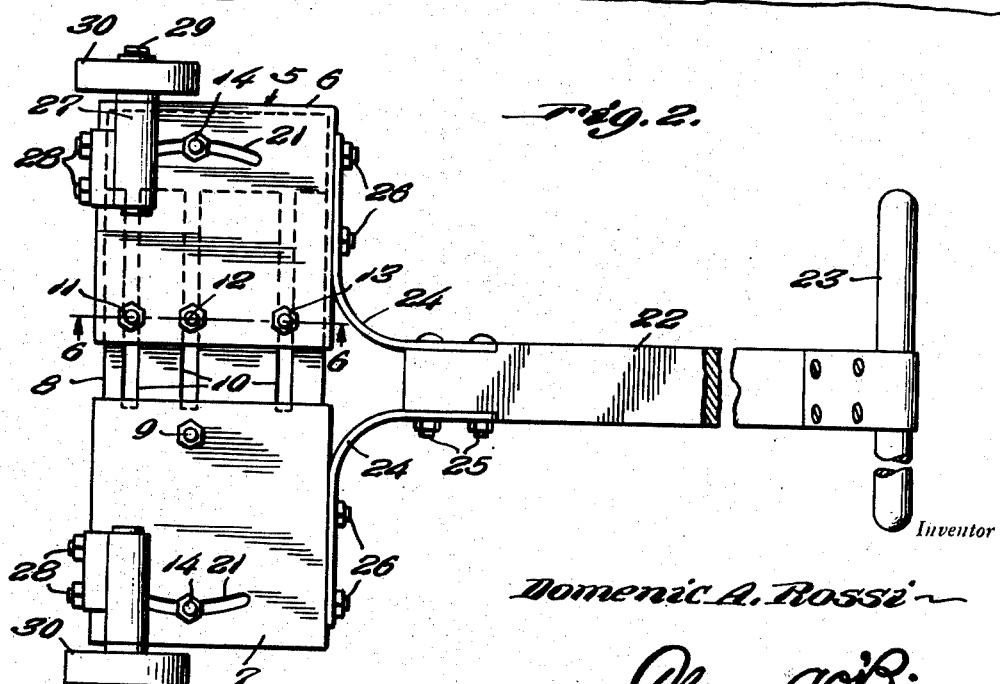
Inventor
Domenic A. Rossi
By Clarence A. O'Brien
and Harvey B. Jacobson
Attorneys

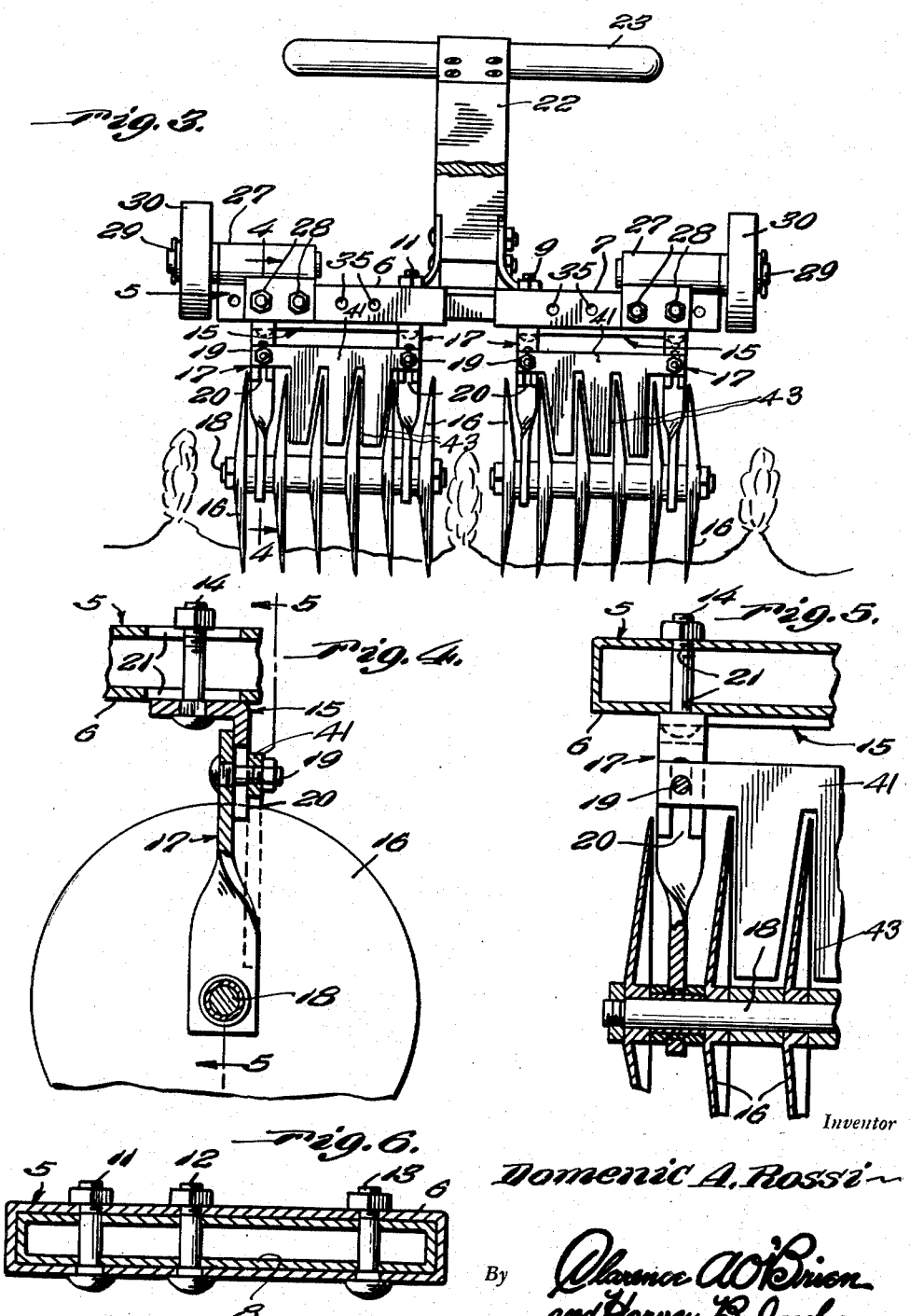

Oct. 3, 1950 — D. A. ROSSI — 2,524,330
DISK TYPE GARDEN CULTIVATOR
Filed Aug. 31, 1946 — 3 Sheets-Sheet 3

Inventor
Domenic A. Rossi
By Clarence A. O'Brien
and Harvey B. Jackson
Attorneys Patented Oct. 3, 1950

2,524,330

UNITED STATES PATENT OFFICE 2,524,330

DISK TYPE GARDEN CULTIVATOR

Domenic A. Rossi, Cleveland, Ohio, assignor of one-half to Joseph A. Mercurio, Cleveland Heights, Ohio Application August 31, 1946, Serial No. 694,213

5 Claims. (Cl. 97—59)

This invention relates to an improved hand or garden cultivator of the type having disc cutters, and the primary object of the invention is to provide a simple, durable and efficient cultivator of this kind which embodies two cultivating units which may be adjusted toward or away from each other to accommodate the cultivator to rows of different widths.

A further object of the present invention is to provide a cultivator of the above kind in which the cultivating units are adjustable to different angular positions relative to the line of travel of the cultivator, whereby to vary the action of the cutters in throwing the soil toward or away from the plants.

The invention consists in the novel form, combination and arrangement of parts hereinafter more fully described, shown in the accompanying drawings, and claimed.

In the drawings:

Figure 1 is a side elevational view, partly broken away, of a cultivator constructed in accordance with the present invention.

Figure 2 is a top plan view thereof.

Figure 3 is a front elevational view of the same.

Figure 4 is an enlarged fragmentary vertical section, taken on line 4—4 of Figure 3, with parts omitted.

Figure 5 is a fragmentary section taken on line 5—5 of Figure 4.

Figure 6 is a vertical section taken on line 6—6 of Figure 2, with parts omitted.

Figure 7:
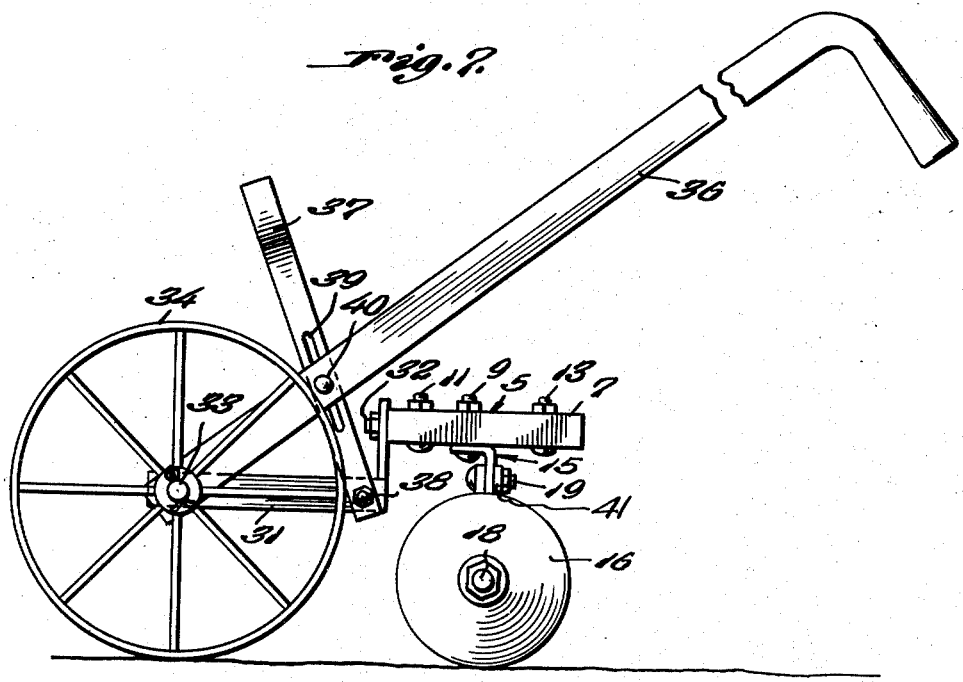
Figure 7 is a view similar to Figure 1, showing a modification of the cultivator illustrated in Figure 1.

Referring in detail to the drawings, the present cultivator includes a frame 5 composed of two hollow slab-like sections 6 and 7 which are adjustable toward or away from each other to vary the width of the frame. The section 6 is open at its inner side and slidably receives a reduced extension 8 which is carried by and projects from the inner side of the section 7. The extension 8 snugly slidably fits in the section 6 and may consist of a hollow slab-like member fitted in the section 7 and secured thereto by bolt and nut means indicated at 9. Extension 8 is provided with spaced parallel elongated slots 10 that extend transversely of the frame to the free outer end of said extension, and nutted bolts 11, 12 and 13 are extended through the inner portion of section 6 and through the slots 10 for securing the sections in relatively adjusted positions.

Bolted to the underside of each frame section 6 and 7 at 12 and 14 and 9 and 14, respectively, is the frame 15 of a cultivating unit. The frame 15 of each cultivating unit carries a plurality of revoluble disc cutters 16. Each frame 15 consists of an upper horizontal member provided at its ends with depending members 17 having a shaft 18 journaled in the lower ends thereof and on which the cutters 16 are secured. The depending members are adjustable in length so as to regulate the height of the frame 5 from the ground. For this purpose, the depending members 17 preferably consist of slidably overlapped sections adjustably bolted together by means of a bolt 19 carried by one section and extending through an elongated slot 20 provided in the other section. The bolts 9 and 12 pivotally attach the inner ends of the frame 15 of the cultivating units to the underside of the main frame 5 of the cultivator for swinging adjustment about vertical axes, whereby to adjust the cultivating units to different angles relative to the line of travel of the cultivator and thereby vary the action of the cutters 16 in throwing the soil toward or away from the plants. The angular adjustment of the cultivating units is permitted by passing the bolts 14 through arcuate slots 21 provided in the sections 6 and 7 concentric with the bolts 9 and 12, respectively. By tightening the nuts on the bolts 9 and 12, the angular adjustment of the cultivating units may be secured. At this time, it is appropriate to mention the fact that the cultivating units are reversible end for end so that the concaved surfaces of the cutters 16 may be faced inward to throw the soil toward the plants, or such concaved surfaces may be faced outward when it is desired to throw the dirt away from the plants.

Handle means is provided for moving and guiding the cultivating units over the ground. In the pull-type of cultivator shown in Figures 1 to 6, inclusive, the handle means preferably consists of an elongated handle 22 provided at one end with a cross-piece or handle bar 23, and having its other end rigidly attached to the frame 5 by means of straps 24. Corresponding ends of the straps 24 are bolted at 25 to opposite sides of the handle 22, and these straps have outwardly directed ends bolted at 26 to the frame sections 6 and 7, respectively. The front edge walls of the sections 6 and 7 may have longitudinal series of openings for selective reception of the bolts 26 so that the straps 24 may be bolted to the sections 6 and 7 regardless of their adjustment toward and away from each other. A similar and equivalent provision would be to provide elongated slots for the bolts 26, either in the outturned ends of straps 24 or the front edge walls of the sections 6 and 7.

As the embodiment of Figures 1 to 6 inclusive includes no ground engaging supporting wheel or wheels, it is desirable to provide means to facilitate transportation of the cultivator from one place to another without allowing contact of the cutters 16 with the ground. For this purpose, brackets or axle mounts 27 are bolted at 28 upon the outer ends of and adjacent the rear edges of the frame sections 6 and 7, said mounts 27 carrying laterally projecting axles 29 on which are journaled ground engaging wheels 30 disposed outwardly of but adjacent the outer sides of the sections 6 and 7. The arrangement is such that when the cultivator is inverted so that the cultivating units project upwardly, the wheels 30 will contact the ground and facilitate transportation of the cultivator from one place to another when not in use.

Figure 8:
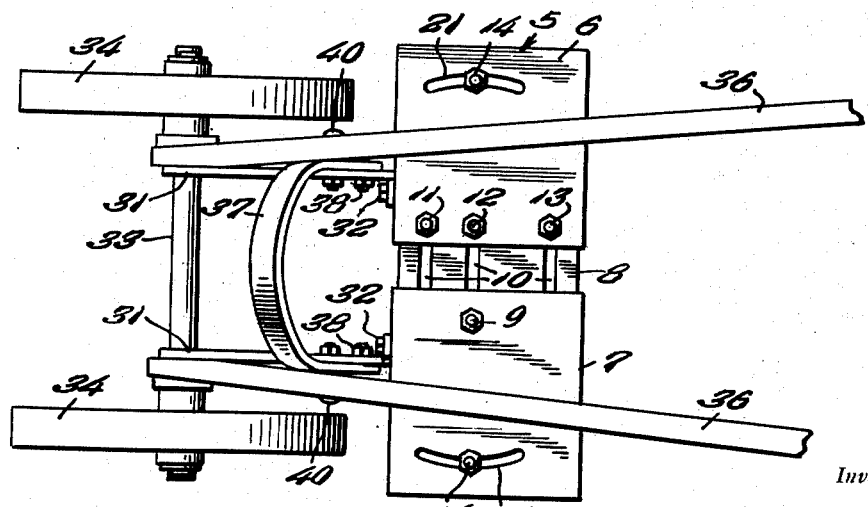
Figure 8 is a top plan view of the cultivator shown in Figure 7.

The embodiment of the invention shown in Figures 7 and 8 is of the type adapted to be pushed forwardly over the ground. This embodiment is the same as that of Figures 1 and 2 in so far as the frame 5 and the cultivating units are concerned. In this embodiment of Figures 7 and 8, however, the wheels 30 and their mounts 27 are dispensed with, and a wheeled handle means is substituted for the handle means 22 to 26 inclusive. As shown, the vertical arms of angular brackets 31 are bolted at 32 to the forward edges of the frame sections 6 and 7, the forwardly projecting lower arms of said brackets 31 having a transverse axle 33 mounted in the forward ends thereof and projecting outwardly therefrom. Relatively large ground engaging supporting wheels 34 are journaled on the projecting ends of the axle 33. The sections 6 and 7 have longitudinal series of openings 35 (see Figure 3) in the forward edges thereof for selective reception of the bolts at 32, so as to permit the relative adjustment of the frame sections 6 and 7 without changing the spacing of the brackets 31. A pair of spaced forwardly converging and inclined handles 36 are hinged at their forward ends upon the axle 33 and extend rearwardly beyond the frame 5 for being grasped in the hands by the operator when pushing the cultivator ahead. Directly in front of the frame 5, the handles 36 are connected by an arched brace 37 whose lower ends are pivoted to the respective brackets 31 as at 38. The legs or end portions of brace 37 are provided with longitudinal elongated slots 39 through which pass bolts 40 that extend through openings in the handles 36. The bolts 40 are nutted, and by loosening the nuts thereof, the handles 36 may be vertically adjusted to suit the height of the operator, the adjustment being secured by tightening the nuts of the bolts at 40. By reason of this construction, the handles 36 are not only braced relative to each other, but such handles are braced relative to the brackets 31 and the brackets 31 are braced relative to the handles. The pivots at 38 accommodate for the varying angles between the parts 31, 36 and 37 when the handles 36 are vertically adjusted. In use, the wheels 34 will sustain a portion of the weight of the frame 5 and parts carried thereby, although the desired downward pressure may be imposed upon the cutters 16 by forcing downwardly on the rear ends of the handles 37. When transporting the cultivator from one place to another, however, the cutters 16 may be lifted out of engagement with the ground by elevating the rear ends of the handles 37, at which time the wheels 34 will sustain all of the weight.

A slotted clearer plate 41 is provided for the disc cutters of each cultivating unit, said clearer plate extending between and bolted at 12 to the depending end members 17 of the frame of said unit. The slots 43 of plate 41 receive the upper portions of the disc cutters, the portions of the plate between these slots and adjacent cutters constituting clearer elements for the latter.

From the foregoing description, it is believed that the construction, operation and advantages of the present cultivator will be readily understood and appreciated by those skilled in the art. It will be particularly seen that a very simple and durable construction is had in which the various desired adjustments are provided for. Minor changes are contemplated, such as fall within the scope of the invention as claimed.

What I claim is:

1. In a hand or garden cultivator, the combination of a main frame consisting of two generally similar hollow slab-like frame sections, one of said frame sections having a reduced extension at its inner end slidably telescoped into the other frame section to vary the width of the frame, means to secure said frame sections in relatively adjusted positions, a cultivating unit beneath each frame section, each cultivating unit embodying an inverted substantially U-shaped frame having an upper horizontal member bolted to the underside of the associated frame section and end members depending from the ends of said horizontal member, and a shaft journaled in the lower ends of said end members and having a gang of disc cutters mounted thereon, and handle means for use in moving the cultivator over the ground including a pair of attaching members secured to corresponding transverse edges of the frame sections, said frame sections being adjustable laterally relative to said attaching members.

2. The construction defined in claim 1, in combination with axle mounts mounted upon the outer ends of said frame sections adjacent the rear edges thereof, axles carried by said axle mounts and projecting laterally therefrom beyond the outer ends of said frame sections, and small ground engaging wheels journaled on the projecting ends of said axles entirely above the disc cutters for use in facilitating transportation of the cultivator from one place to another when said cultivator is inverted with the cultivating units projecting upwardly.

3. The construction defined in claim 1, in combination with axle mounts mounted upon the outer ends of said frame sections adjacent the rear edges thereof, axles carried by said axle mounts and projecting laterally therefrom beyond the outer ends of said frame sections, small ground engaging wheels journaled on the projecting ends of said axles entirely above the disc cutters for use in facilitating transportation of the cultivator from one place to another when said cultivator is inverted with the cultivating units projecting upwardly, said handle means including an elongated handle, said attaching members comprising straps bolted at corresponding ends to one end of the handle and having the other ends thereof outturned, and means to adjustably bolt the other corresponding ends of said straps to the forward edges of said frame sections so as to permit the relative adjustment of said frame sections.

4. In a hand or garden cultivator, the combination of a main frame consisting of two hollow slab-like frame sections, one of said frame sections having a reduced extension at its inner side slidably telescoped into the other frame section to vary the width of the frame, means to secure said frame sections in relatively adjusted positions, a cultivating unit beneath each frame section, each cultivating unit embodying an inverted substantially U-shaped frame having an upper horizontal member and end members depending from said upper member, and a shaft journaled in the lower ends of said end members and having a gang of disc cutters mounted thereon, means pivotally attaching the inner end of the upper horizontal member of the frame of each cultivating unit to the underside of the associated frame section to provide for swinging adjustment of the cultivating unit about a vertical axis so as to adjust the cultivator section to different angular positions relative to the line of travel of the cultivator, means at the outer end of each upper horizontal member to secure the cultivating units in different positions of angular adjustment, and handle means for use in moving the cultivator over the ground including attaching members secured to corresponding transverse edges of the frame sections.

5. In a hand or garden cultivator, the combination of a main frame consisting of two hollow slab-like frame sections, one of said frame sections having a reduced extension at its inner side slidably telescoped into the other frame section to vary the width of the frame, means to secure said frame sections in relatively adjusted positions, a cultivating unit beneath each frame section, each cultivating unit embodying an inverted substantially U-shaped frame having an upper horizontal member bolted to the underside of the associated frame section and end members depending from the ends of said horizontal member, and a shaft journaled in the lower ends of said end members and having a gang of disc cutters mounted thereon, angular spaced brackets having vertical arms bolted to the forward edges of the frame sections and including forwardly projecting lower horizontal arms, a transverse axle mounted in the forward ends of said forwardly projecting horizontal arms, ground engaging wheels journaled on the ends of said axle, spaced forwardly inclined handles pivoted at their forward ends on said axle, an arched brace pivoted at its ends to said brackets and having elongated slots in the end portions thereof, and clamping bolts passing through said slots and the handles for connecting the brace to the latter and securing the handles in different vertical adjusted positions.

DOMENIC A. ROSSI.

REFERENCES CITED

The following references are of record in the file of this patent:

UNITED STATES PATENTS

| Number | Name | Date |
|---|---|---|
| 422,161 | Ruggles | Feb. 25, 1890 |
| 540,251 | Hamachek | June 4, 1895 |
| 831,531 | Brantner | Sept. 25, 1906 |
| 901,221 | Watson | Oct. 13, 1908 |
| 950,084 | Watson | Feb. 22, 1910 |